United States Patent
Ton-That et al.

(10) Patent No.: US 10,269,076 B1
(45) Date of Patent: Apr. 23, 2019

(54) ELECTRONIC DEVICE UTILIZING A RISK REDUCTION MECHANISM TO MANAGE PROPERTY

(71) Applicant: THE TRAVELERS INDEMNITY COMPANY, Hartford, CT (US)

(72) Inventors: Hoa Ton-That, Glastonbury, CT (US); Noot Vue, Ramsey, MN (US); Benjamin J. Joyce, Manchester, CT (US); Reyer Swengel, St. Paul, MN (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 344 days.

(21) Appl. No.: 15/089,012

(22) Filed: Apr. 1, 2016

Related U.S. Application Data

(60) Provisional application No. 62/161,058, filed on May 13, 2015.

(51) Int. Cl.
  *G06Q 40/08* (2012.01)
  *G06Q 50/16* (2012.01)
(52) U.S. Cl.
  CPC .......... *G06Q 40/08* (2013.01); *G06Q 50/163* (2013.01)
(58) Field of Classification Search
  None
  See application file for complete search history.

(56) References Cited

U.S. PATENT DOCUMENTS

| | | | |
|---|---|---|---|
| 8,676,612 B2 | 3/2014 | Helitzer et al. | |
| 8,730,039 B1 | 5/2014 | Billman | |
| 8,731,975 B2 | 5/2014 | English et al. | |
| 8,749,381 B1 | 6/2014 | Maroney et al. | |
| 8,890,680 B2 | 11/2014 | Reeser et al. | |
| 8,981,930 B2 | 3/2015 | Horstemeyer et al. | |
| 9,892,463 B1 * | 2/2018 | Hakimi-Boushehri | G06Q 40/08 |
| 2013/0096787 A1 * | 4/2013 | Holub | F16H 61/12 701/54 |
| 2013/0184929 A1 * | 7/2013 | Salman | G05B 23/0283 701/31.5 |
| 2014/0081675 A1 * | 3/2014 | Ives | G06Q 40/08 705/4 |
| 2014/0201315 A1 | 7/2014 | Jacob et al. | |
| 2015/0073834 A1 * | 3/2015 | Gurenko | G06Q 40/08 705/4 |
| 2016/0071398 A1 | 3/2016 | Boss et al. | |

OTHER PUBLICATIONS

J. Reifel, et al.: "The Connected Home: The Next Frontier for P&C Insurers?"; Apr. 25, 2015; pp. 3.

* cited by examiner

*Primary Examiner* — Joseph W. King
(74) *Attorney, Agent, or Firm* — Cantor Colburn LLP

(57) ABSTRACT

A system for risk reduction is provided. The system includes a processing device and a memory device. The memory device stores instructions that when executed by the processing device may result in receiving a first input corresponding to an asset of a user and deriving as a second input a benchmark from system data stored on a database. The instructions that when executed by the processing device may further result in calculating a difference between the first input and the second input, wherein a difference exceeding a predetermined amount indicates existence of the degradation condition, in which substantial damage to or failure of the asset or a component of the asset is imminent.

19 Claims, 10 Drawing Sheets

US 10,269,076 B1

ELECTRONIC DEVICE UTILIZING A RISK REDUCTION MECHANISM TO MANAGE PROPERTY

BACKGROUND

Property owners and/or property managers typically need to monitor property conditions to ensure that necessary maintenance is handled to extend the use and enjoyment of the property. When property condition monitoring is neglected, there is an increased risk of the property breaking, degrading, causing serious harm, and/or requiring extensive repairs, resulting in unwanted costs. Further, even when the condition of the property is monitored, the risk of unforeseen events that can damage the property, cause serious harm, and/or result in unwanted expenses still exists.

Insurance companies can provide insurance policies to cover a variety of damage or property loss scenarios associated with these risks, thereby making a policyholder whole in the event of property damage or loss. Reactive protection provided by insurance coverage is less preventative and more alleviative. Insurance companies may provide general publications with suggested actions to reduce certain types of risks, but typically do not proactively seek to reduce the risks of property damage or loss on an individualized basis. Such proactive measures would benefit policyholders by reducing their losses and possibly lowering premiums, and could benefit insurers by reducing claim payments.

BRIEF DESCRIPTION OF THE DRAWINGS

The subject matter is particularly pointed out and distinctly claimed in the claims at the conclusion of the specification. The features and advantages of the subject matter are apparent from the following detailed description taken in conjunction with the accompanying drawings in which:

DETAILED DESCRIPTION

Figure 1:
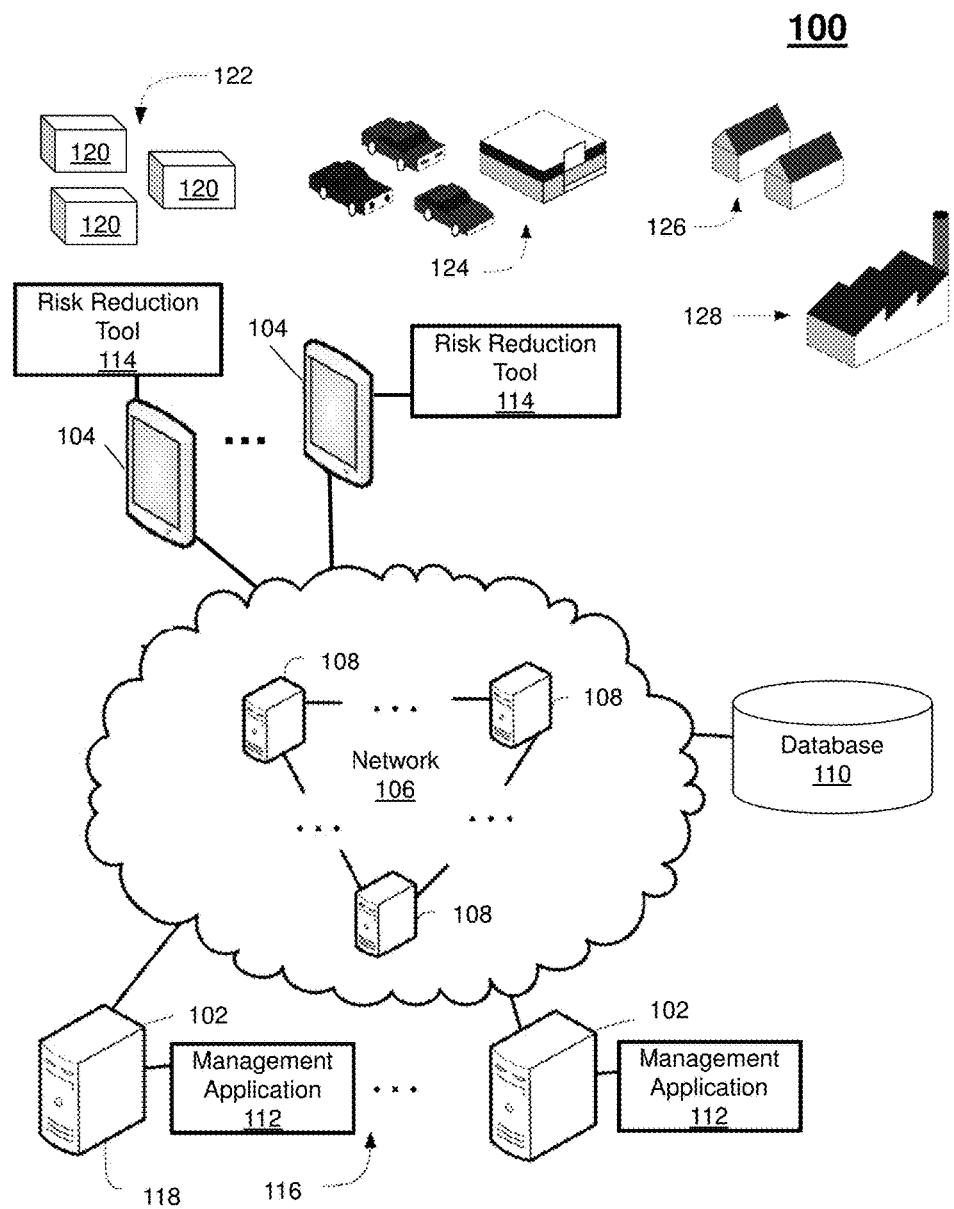
FIG. 1 depicts a block diagram of a system according to some embodiments of the present invention.

According to an embodiment, a management application that utilizes data to determine whether a degradation condition exists for an asset is provided. Further, when the management application determines for the asset that the degradation condition exists, the management application outputs a notification that prompts a user to take an action that addresses the degradation condition. By identifying degradation conditions and notifying users to address them, insurance companies and the like can utilize the management application to proactively reduce the risks of asset damage or loss.

The management application generally comprises computer readable instructions for performing the degradation condition determination, where the computer readable instructions are executable by a processor and stored on a memory. The management application operates within a system that includes one or more management computers, one or more user computing devices, and/or one or more databases that can communicate via a network (each of which is further described below). The management application is necessarily rooted in this system to perform proactive operations to overcome problems specifically arising in the realm of asset ownership and/or management (e.g., these problems include the asset breaking, degrading, causing serious harm, and/or requiring extensive repairs, resulting in unwanted costs and expenses). For example, because present reactive asset protection measures are non-optimal, the proactive degradation condition identification and proactive user notification may reduce, and in some cases may eliminate, the risks of asset damage or loss on an individualized basis.

The asset can comprise any type of property that has an associated risk of loss, damage, failure, or liability. General categories of assets include real property and personal property. Examples of real property include, but are not limited to, commercial and residential property and associated structures. Examples of personal property include, but are not limited to, vehicles, such as cars, boats, aircraft, and personal watercraft, appliances, electronics, and other movable assets.

The data generally comprises sets of values of qualitative or quantitative variables, individual pieces of information, and/or unprocessed collections of characters, each of which can be represented in a structure (e.g., a data structure such as a table or tree). The data can be categorized as asset data and/or system data. The asset data includes status and/or usage information specific to the asset that the management application is currently evaluating for the degradation condition. The system data includes a collection of asset data for one or more assets. For example, the system data can include asset data for the currently evaluated asset and for multiple other assets. The asset data and/or system data can comprise qualitative or quantitative values detected by sensors monitoring the asset, i.e., sensor data; policy information associated with the asset, such as insurance coverage, policy term, and primary policy holder; credentials or characteristics that describe the asset, such as condition, quality, age, color, size, shape, type, make, and model; images of the asset; geographic information associated with the asset; etc. Thus, the system is enhanced by the ability of the management application to utilize the asset data and/or system data when evaluating degradation conditions.

A degradation condition exists when substantial damage to or failure of an asset or a component of an asset is imminent. Multiple aspects of an asset may be assessed for a degradation condition, such that, while one aspect of the asset is operating correctly or in a good condition, another aspect could be determined by the management application to be in a degradation condition.

In one example, the management application may be used to evaluate a house (e.g., an asset) to determine whether a degradation condition exists. The management application may assess multiple aspects of the house, including the status of one or more sensors (e.g., humidity, light, and temperature), the status of a fire prevention system, the status of an appliance, etc. If the management application determines that the degradation condition exists for one of these aspects, then a notification can be sent to the user (e.g., homeowner, policyholder, claim handler, service personnel, etc.) prompting the user to address the degradation condition.

For instance, a sensor in communication with the management application can detect asset data, e.g., sensor data indicating a drop in water pressure within a plumbing system of the house. With respect to the plumbing system of the house, system data can detail that certain decreases in water pressure indicate that the plumbing system is at or near a failure point (i.e., a point at which a functioning ability of an asset or component of an asset ceases—in this example: a burst pipe or failed water heater). Thus, the failure point can comprise a mechanical or machine failure, and the degradation condition can comprise one or more parameters indicating the mechanical or machine failure. Based on the asset data and the system data, the management application can determine whether the degradation condition exists for the house. That is, when a comparison by the management application of the detected drop in the water pressure with decreases in water pressure characteristic of a device failure reveal that the degradation condition exists, the management application can send a notification to the user to check the house and mitigate any possible water damage to the house and property within the house.

Further, the degradation condition (i.e., when substantial damage to or failure of an asset or a component of an asset is imminent) can also be determined as an actual condition of an asset being monitored approaches over time an average failure point at a same rate as or faster than an average condition change for similar assets of the system data. The average rate at which assets of the system data approach an average failure point can be referred to as a benchmark trend. The rate at which an asset being monitored approaches that average failure point can be referred to as an asset trend. The actual condition of the asset is the present quality and functioning ability of the asset being monitored. The average failure point is derived from the system data to indicate an average point in time at which assets similar to the one currently being monitored by the management application reached their respective failure points.

In another example, the management application may be used to evaluate a vehicle (e.g., an asset) to determine whether a degradation condition exists. The management application monitors and/or evaluates the vehicle across multiple aspects for degradation conditions corresponding to each of those aspects. The multiple aspects of the vehicle can include tire pressure, engine temperature, fluid levels, etc. If the management application determines that a degradation condition exists for one of these aspects, then a notification can be sent to the user to address the degradation condition. For instance, a sensor in communication with the management application can detect asset data over time, such as actual tire pressure of the tires of the vehicle (e.g., the sensor produces sensor data regarding tire pressure respective to time intervals, vehicle speed, and weather). Further, the management application determines in comparison to system data, which indicates an average pressure change rate over time for tires of similar vehicles, that the asset data indicates that the tire pressure is decreasing at a faster than the average pressure change rate (e.g., the asset trend has a greater slope than the benchmark trend). Then, the management application can determine that the degradation condition exists for the vehicle (i.e., the tire has a slow leak) based on the comparison of the system data to the detected decrease in tire pressure. In turn, the management application can send a notification to the user to check the tires and reduce a risk of a vehicle accident due to improper road traction based on low tire pressure. Further, this notification may be triggered prior to reaching a sufficiently low tire pressure that would trip an existing low tire pressure warning system of the vehicle, such that the vehicle operator has advanced warning before reaching a critically low tire pressure. Thus, while existing low tire pressure warning systems are non-optimal due to delayed warnings, the proactive degradation condition identification and notification operations according to aspects of the embodiments herein may reduce, and in some cases may eliminate, the risks of the critically low tire pressure causing asset damage or loss.

Turning now to FIG. 1, a system 100 is depicted upon which a risk reduction process may be implemented. The risk reduction process is a process executed by the system and components therein for utilizing data to determine whether a degradation condition exists for an asset and outputting a notification that prompts an action that addresses the degradation condition associated with that asset (e.g., reduces a failure risk or a trend towards failure). The system 100 will be described, by way of example and not limitation, with reference to the insurance industry.

The system 100 includes one or more management computers 102 and one or more user computing devices 104 that can communicate via a network 106. The network 106 may comprise a cloud-computing network that includes a plurality of servers 108 (e.g., cloud servers) operable to access a database 110. The database 110 may comprise a network-accessible database, such as a cloud-based database, that can be read from and written to by the management computers 102 and the user computing devices 104. Each of the management computers 102 may have a management application 112 that provides a management user interface for accessing the database 110 and communicating with the user computing devices 104, and each of the user computing devices 104 may have a risk reduction tool 114 that provides a risk reduction user interface for accessing the database 110 and communicating with the management computers 102. Through these interfaces, one or more users of the management computers 102 and the user computing devices 104 may provide feedback to guide future notifications with respect to determinations of degradation conditions.

In one example, the management application 112 may comprise an application provided by a service provider (e.g., an insurance company) that can transmit information to a user (e.g., an insured). This information can direct/prompt the user to take action with regard to an asset to prevent asset damage or loss. The action may include, for example, one or more of checking a tire pressure, checking a roof for leaks, preparing for severe weather, and performing home maintenance. Further, the risk reduction tool 114 can report information (e.g., weather, tire pressure changes, home maintenance, etc.) to the management application 112 of an insurance company that can be utilized in determining whether asset damage or loss can be prevented. In addition, risk reduction tool 114 can send information (e.g., location, usage, and other asset data) about the insured asset that is useful for mitigating risks to the insurance company. Thus, the management application 112 and/or the risk reduction tool 114, which are necessarily rooted in the system 100, are mechanisms to inform a user of an opportunity to reduce risks. The risk reduction tool 114 may be particularly advantageous for time-critical risks and may provide suggestions to mitigate such risks (e.g., inflating vehicle tires)

at an appropriate time (e.g., when the vehicle tires are low and/or when the vehicle arrives at a gas station) to greatly improve the chances the suggested action will be taken. Note that 'appropriate' can mean at a time in advance of a failure point, at a time at which the user is most capable of addressing the risk, etc.

The mechanisms to inform the user can include a notification. In general, a notification is a tool for delivering and/or identifying information (or non-existence of the information, such as sensor data is not being received by the management application 112 due to a failed sensor or powered off sensor) to the users responsible for an asset (and in some cases to the insurance company insuring the asset). Examples of notifications may include, but are not limited to, text messaging (e.g., short message service), audio alerts (e.g., telephone calls, cellphone calls, VoIP calls, voicemails, loudspeaker announcements, etc.), electronic mail (e.g., post office protocol, internet message access protocol, simple mail transfer protocol), desktop alerts (e.g., dialog, balloon, modal window, toast, etc.), paging, and instant messaging. Examples of information provided by the notification include instructions to check an asset (e.g., to check a tire pressure, to check a piping system for damage, to check a roof for leaks, etc.), to prepare for an upcoming event (e.g., to prepare for severe weather, to perform home maintenance, to perform car maintenance), etc. Thus, based on asset and system data, the management application 112 can create and provide notifications to the insured as described in one or more of the examples above using the risk reduction tool 114. In other embodiments, the notifications can be created and provided by the risk reduction tool 114 independent of the management application 112, as further described below.

Each of the management computers 102 may comprise a personal computer (e.g., a laptop, desktop, etc.), a workstation, or server that can access system data in the database 110 and communicate with one or more of the user computing devices 104. The user computing devices 104 may comprise any electronic device or type of portable computing device capable of executing the risk reduction tool 114 and interfacing with the network 106, such as a tablet computer, a smartphone, a wearable device, a notebook computer, a netbook computer, and the like. The servers 108 can comprise any type of computing node operable to support networking functions of the network 106, including a combination of physical and virtual machines.

In the example of FIG. 1, each of the management computers 102, the user computing devices 104, and the servers 108 can include a processor (e.g., a processing device, such as one or more microprocessors, one or more microcontrollers, and/or one or more digital signal processors) that receives instructions (e.g., from memory or like device), executes those instructions, and performs one or more processes defined by those instructions. Instructions may be embodied, for example, in one or more computer programs and/or one or more scripts. Each of the management computers 102, the user computing devices 104, and the servers 108 can include a local data storage device, such as a memory device, to store instructions and data. A memory device, also referred to herein as "computer-readable memory" (e.g., non-transitory memory devices, as opposed to transmission devices or media), may generally store program instructions, code, and/or modules that, when executed by a processing device, cause a particular machine to function in accordance with one or more embodiments described herein. In one example, at least one of the management computers 102 and the user computing devices 104 executes computer instructions for implementing the exemplary processes described herein. Although only the management application 112 and the risk reduction tool 114 are depicted in FIG. 1, it will be understood that each of the management computers 102, the user computing devices 104, and the servers 108 can execute a number of other programs, such as application programs and operating systems. The management application 112 and the risk reduction tool 114 may each be further subdivided into a number of modules or sub-programs.

The network 106 may establish communication within the system 100 using a combination of networks, such as a wide area network (WAN), a local area network (LAN), a global network (e.g., Internet), a virtual private network (VPN), and/or an intranet. The network 106 may support fiber optic, wired, and/or wireless communication links. The network 106 can support transmission of digitized data including digitized images, video, audio, and/or other data types. Other networks (not depicted) can also be utilized by elements of the system 100, such as cellular communication, satellite communication, and other network types.

The database 110 may be implemented using a variety of devices for storing electronic information, such as the data described above. It is understood that the database 110 may be implemented using memory contained in one or more of the servers 108 or may comprise a separate physical system, as shown in FIG. 1. It will be understood that multiple storage devices may be employed to store the database 110. For example, the storage devices used to store the database 110 can be dispersed across the network 106, and each of the storage devices that collectively form the database 110 may be logically addressable as a consolidated data source across a distributed environment.

In some embodiments, the management computers 102 can be located at a common location or in a plurality of locations. In the example of FIG. 1, the management computers 102 are located at an office location 116 from where a risk reduction process can be initiated. One of the management computers 102 may be referred to as an initiator system 118 if it is used to send notifications and/or requests to one or more of the user computing devices 104. The notifications can indicate that a particular user or users of one or more of the user computing devices 104 should initiate an action for at least one of a plurality of physical assets 120, which are at a remote location 122 relative to the initiator system 118. The requests can query a particular user or users of one or more of the user computing devices 104 for asset data of at least one of the plurality of physical assets 120.

The physical assets 120 are assets as described above (e.g., any type of property that has an associated risk of loss, damage, failure, or liability). The remote location 122 may include sensors for detecting asset data for any or all of the plurality of physical assets 120. In general, a sensor is any device that detects events or changes in quantities and provides a corresponding output, e.g., as an electrical or optical signal. Examples of quantities that a sensor can detect include, but are not limited to light, motion, temperature, magnetic fields, gravity, humidity, moisture, vibration, pressure, electrical fields, sound, and other physical aspects of an external environment. The sensors can be in communication with the risk reduction tool 114 and/or management application 112 and be selected and installed based on a risk type specific to a type of physical asset 120 and/or business/residence type at the remote location 122. Thus, for example, the sensors used at a location 124 may be associated with a vehicle rental business (e.g., tire pressure sensors) and, therefore, may detect statuses of rental cars to mitigate accident and theft risks. The sensors used at a location 126 can be for residential assets, and, therefore, may detect statuses of houses to mitigate damage and theft risks. The sensors used at a location 128 may be for factory/manufacturer assets and, therefore, may detect statuses of factory equipment, safety systems, and the like to mitigate accident and property damage risks. In this way, any number of asset types can be supported, depending upon a desired type of degradation condition monitoring performed by the system 100.

Figure 2:
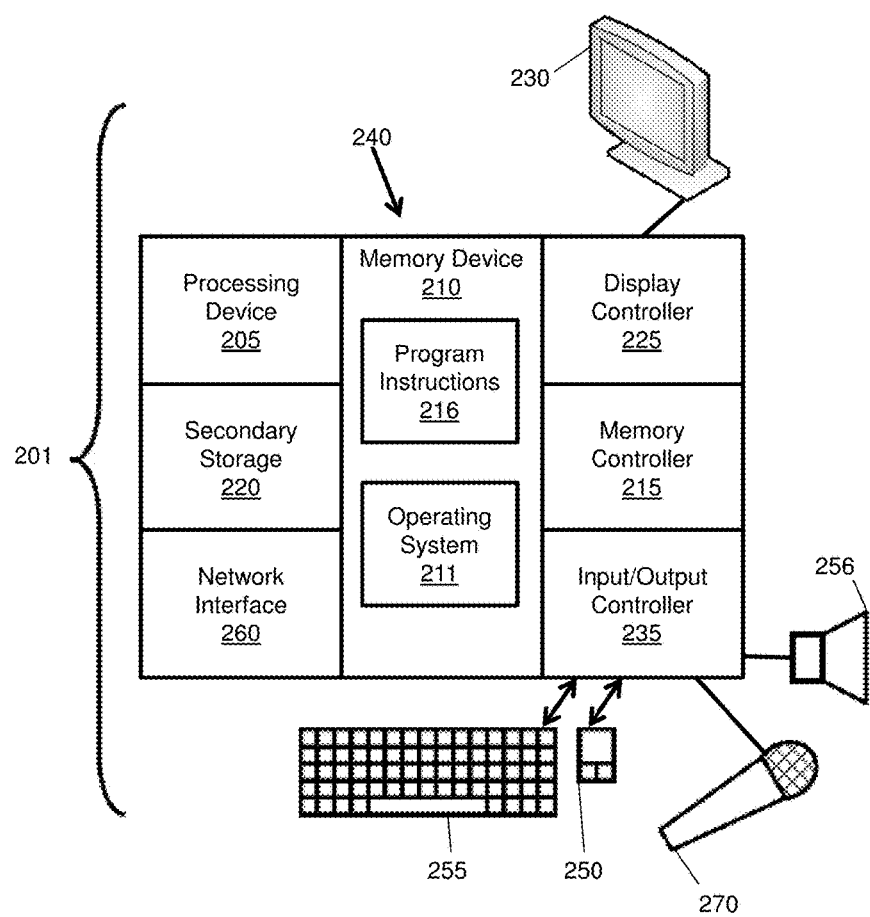
FIG. 2 depicts a block diagram of another system according to some embodiments of the present invention.

FIG. 2 depicts a block diagram of a system 200 according to an embodiment. The system 200 is depicted embodied in a computer 201 in FIG. 2. The system 200 is an example of one of the management computers 102 of FIG. 1. The servers 108, the user computing devices 104, and the database 110 of FIG. 1 can also include similar computer elements as those depicted in the computer 201 of FIG. 2.

In an exemplary embodiment, in terms of hardware architecture, as shown in FIG. 2, the computer 201 comprises a processing device 205 and a memory device 210 coupled to a memory controller 215 and an input/output controller 235. The input/output controller 235 may comprise one or more buses or other wired or wireless connections, as is known in the art. The input/output controller 235 may comprise additional elements, which are omitted for simplicity, such as controllers, buffers (caches), drivers, repeaters, and receivers, to enable communications. Further, the computer 201 may comprise address, control, and/or data connections to enable communications among the aforementioned components.

In an exemplary embodiment, a mouse 250 and keyboard 255 or similar devices can be coupled to the input/output controller 235. Alternatively, input may be received via a touch-sensitive or motion sensitive interface (not depicted). The computer 201 can further include a display controller 225 coupled to a display 230. One or more speakers 256 and/or a microphone 270 can be coupled to the input/output controller 235 to support audio interactions with one or more of the computers 201 (e.g., management computers 102, user computing devices 104, etc.). In an embodiment, the computer 201 can support Voice over Internet Protocol (VoIP) or other communication protocols known in the art.

The processing device 205 is a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 may comprise any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remotely from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions of and/or instructions to implement the management application 112 of FIG. 1, where the system 200 is an embodiment of the management computers 102 of FIG. 1, and the risk reduction tool 114 of FIG. 1, where the system 200 is an embodiment of the user computing devices 104 of FIG. 1

The computer 201 of FIG. 2 also includes a network interface 260 that can establish communication channels with one or more other computer systems via one or more network links. The network interface 260 can support wired and/or wireless communication protocols known in the art. For example, when embodied in one of the management computers 102 of FIG. 1, the network interface 260 can establish communication channels with one or more user computing devices 104 of FIG. 1 and/or the database 110 of FIG. 1 via the network 106 of FIG. 1.

Figure 3:
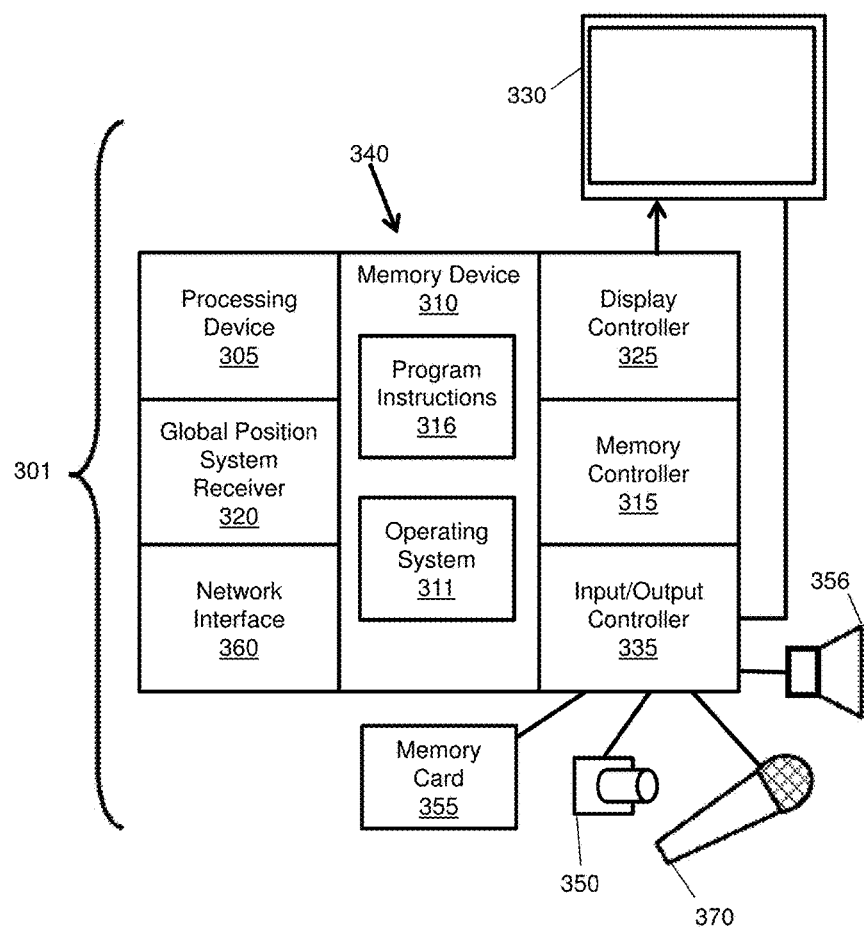
FIG. 3 depicts a block diagram of another system according to some embodiments of the present invention.

FIG. 3 depicts a block diagram of a system 300 according to an embodiment. The system 300 as depicted is embodied in a mobile computing device 301 in FIG. 3. The system 300 is an example of the user computing devices 104 of FIG. 1. The servers 108, the management computers 102, and the database 110 of FIG. 1 can also include similar computer elements as those depicted in the mobile computing device 301 of FIG. 3.

In an exemplary embodiment, in terms of hardware architecture, as shown in FIG. 3, the mobile computing device 301 comprises a processing device 305 and a memory device 310 coupled to a memory controller 315 and an input/output controller 335. The input/output controller 335 may comprise one or more buses or other wired or wireless connections, as is known in the art. The input/output controller 335 may comprise additional elements, which are omitted for simplicity, such as controllers, buffers (caches), drivers, repeaters, and receivers, to enable communications. Further, the mobile computing device 301 may comprise address, control, and/or data connections to enable communications among the aforementioned components.

In some embodiments, a touch-sensitive display 330 or similar device can be coupled to the input/output controller 335. Alternatively, input may be received via a keypad, keyboard, or motion sensitive interface (not depicted). The input/output controller 335 can receive image data via one or more integrated cameras 350. Extended storage capacity for image data, video, and the like can be supported using a memory card 355 coupled to the input/output controller 335. The input/output controller 335 may also be coupled to one or more speakers 356 and/or microphones 370 to support audio interactions with one or more of the management computers 102 and database 110 of FIG. 1. In an embodiment, the mobile computing device 301 can support VoIP, cellular transmissions, or other communication protocols known in the art. The mobile computing device 301 can further include a display controller 325 coupled to the touch-sensitive display 330. In an alternate embodiment, a standard video display is provided in place of the touch-sensitive display 330 and other inputs, such as a keyboard and touchpad, are used to provide input to the mobile computing device 301.

The processing device 305 is a hardware device for executing software, particularly software stored in memory device 310. The processing device 305 can comprise any custom made or commercially available computer processor, a central processing unit (CPU), an auxiliary processor among several processors associated with the mobile computing device 301, a semiconductor-based microprocessor (in the form of a microchip or chip set), a macro-processor, or generally any device for executing instructions.

The memory device 310 may comprise any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette, etc.). Moreover, the memory device 310 may incorporate electronic, magnetic, optical, and/or other types of storage media. Accordingly, the memory device 310 is an example of a tangible computer readable storage medium 340 upon which instructions executable by the processing device 305 may be embodied as a computer program product. The memory device 310 can have a distributed architecture, where various components are situated remotely from one another, but can be accessed by the processing device 305.

The instructions in memory device 310 may include one or more separate programs, each of which comprises an ordered listing of executable instructions for implementing logical functions. In the example of FIG. 3, the instructions in the memory device 310 include a suitable operating system (OS) 311 and program instructions 316. The operating system 311 essentially controls the execution of other computer programs and provides scheduling, input-output control, file and data management, memory management, and communication control and related services. When the mobile computing device 301 is in operation, the processing device 305 is configured to execute instructions stored within the memory device 310, to communicate data to and from the memory device 310, and to generally control operations of the mobile computing device 301 pursuant to the instructions. Examples of program instructions 316 can include instructions of and/or instructions to implement the risk reduction tool 114 of FIG. 1, where the system 300 is an embodiment of the user computing devices 104 of FIG. 1, and the management application 112 of FIG. 1, where the system 300 is an embodiment of the management computers 102 of FIG. 1.

The mobile computing device 301 may also include a global position system (GPS) receiver 320. The GPS receiver 320 may be used to generate geotags to apply to asset data acquired and/or managed by the mobile computing device 301, such as image data (photos and/or video), audio data, and other data values recorded. Geotags identify a location, such as coordinates of the mobile computing device 301, of the remote location 122 of FIG. 1, and of the physical assets 120 of FIG. 1. An internal clock (not depicted) can also provide date/time information with the geotag or as a separate data tag for assessment data, image data, and other data captured by the mobile computing device 301. For example, a notification that includes suggestions to mitigate risks (e.g., inflating vehicle tires) can be provided at the appropriate time (e.g., when the vehicle arrives at a gas station) to greatly improve the chances that the suggested action will be taken. In this way, the geotags may be utilized as a mechanism for detecting where a user is located when the degradation condition exists.

The mobile computing device 301 also includes a network interface 360 that can establish communication channels with one or more other computer systems via one or more network links. The network interface 360 can support wired and/or wireless communication protocols known in the art. For example, when embodied in one of the user computing devices 104 of FIG. 1, the network interface 360 can establish communication channels with one or more management computers 102 of FIG. 1 and/or the database 110 of FIG. 1 via the network 106 of FIG. 1. The network interface 360 may also support one or more other types of networks, such as a cellular network and/or satellite communication. In some embodiments, the network interface 360 supports communication protocols that enable the mobile computing device 301 to directly link with electronic systems, such as a security system, programmable thermostat, fire detection system, an in-vehicle network, a sensing system, and/or other localized device(s) or network(s) to acquire status and history information. For instance, the network interface 360 may support Wi-Fi, Bluetooth, near-field communication (NFC), radio frequency identification (RFID), and the like.

Figure 4:
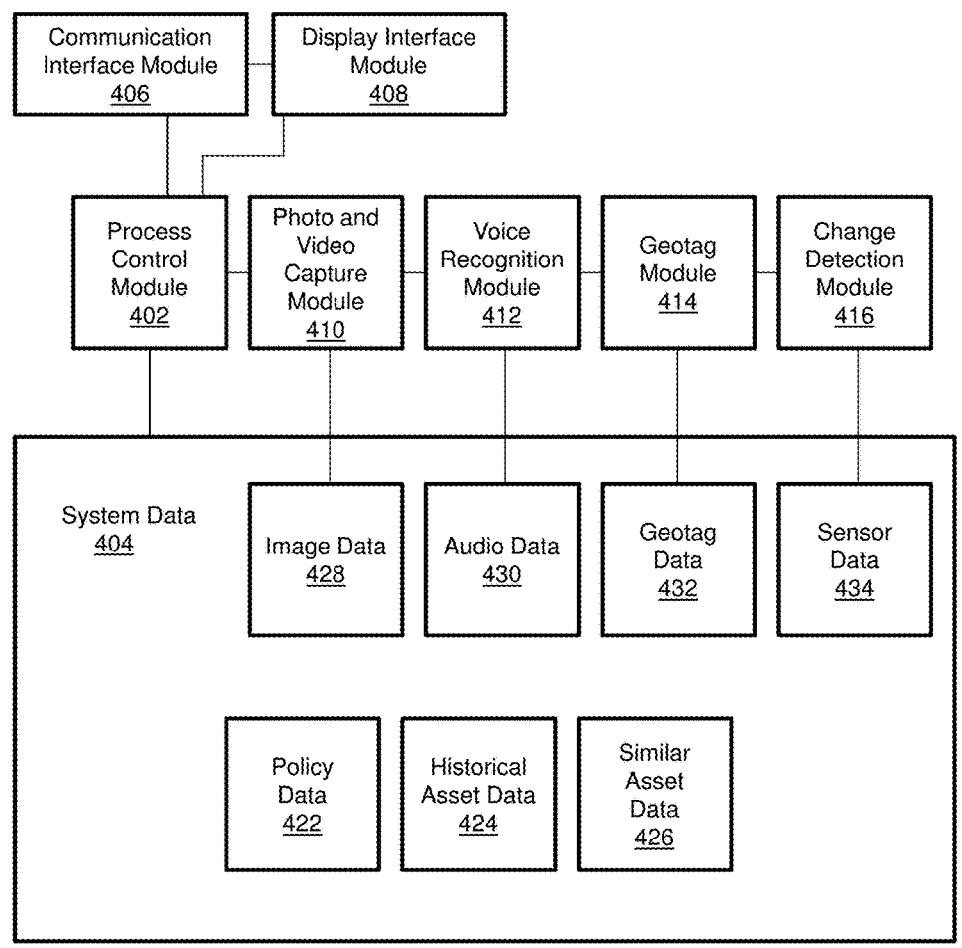
FIG. 4 depicts relationships between modules and data according to some embodiments of the present invention.

FIG. 4 depicts exemplary relationships between modules and data in the management computers 102 and user computing devices 104 of FIG. 1 according to some embodiments. In the example device 400 of FIG. 4, a plurality of modules 402, 406, 408, 410, 412, 414, 416 implement functionality of the management application 112 and/or the risk reduction tool 114 of FIG. 1. The modules 402, 406, 408, 410, 412, 414, 416 can comprise executable groups of the program instructions (e.g., 216 of FIG. 2 or 316 of FIG. 3) formatted as executable objects, scripts, functions, or the like using a programming language that is compatible with the operating system (e.g., 211 of FIG. 2 or 311 of FIG. 3). A process control module 402 can control sequencing of data acquisition and interactions with system data 404 that may be stored in the database 110 of FIG. 1, the memory device (e.g., 210 of FIG. 2 or 310 of FIG. 3), or the memory card 355 of FIG. 3. The process control module 402 may interface with a communication interface module 406 that establishes external communication via the network interface (e.g., 260 of FIG. 2 or 360 of FIG. 3). The process control module 402 can also interface with a display interface module 408, a photo and video capture module 410, a voice recognition module 412, a geotag module 414, and a change detection module 416, each of which may be utilized, for example, to receive user feedback from the user in response to the notifications.

The system data 404 may include, for example, policy data 422, historical asset data 424, similar asset data 426, image data 428, audio data 430, geotag data 432, sensor data 434, and other data (not depicted). The policy data 422 can comprise record data itemizing insurance policy information, such as assets insured, value insured, policy term, primary policy holder, etc. The policy data 422 can also be record data specific to an insured asset, such as itemizing an initial asset condition, initial asset quality, asset age, characteristics (e.g., color, size, shape, type, make, and model), etc. The historical asset data 424 can provide asset modification and/or status changes over time with respect to each asset associated with the policy data 422. The similar asset data 426 can include asset data for assets other than the assets identified by the policy data 422. The image data 428 can include photos and/or videos captured by, for example, sensors, security systems, and the integrated camera 350 of FIG. 3, and processed by the photo and video capture module 410. The audio data 430 can include data captured by, for example, sensors, security systems, and the microphone 370 of FIG. 3, and processed by the voice recognition module 412, which may convert the audio data 430 into text data for storage in the database 110 of FIG. 1. The geotag data 432 can include location data relevant to insured assets or otherwise associated with an insurance policy and can be populated by the geotag module 414, for example, based on data received from the GPS receiver 320 of FIG. 3. The geotag data 432 can be added to the system data 404 for inclusion in the database 110 of FIG. 1 or can be utilized with respect to determining a degradation condition.

The sensor data 434 can comprise information regarding the type of sensors monitoring the conditions of the assets and/or can comprise qualitative or quantitative values detected by the sensors monitoring the assets of the policy data 422. In this way, the sensor data 434 can be used to detect changes by the change detection module 416, where the sensor data 434 corresponds to real-time sensor outputs, as received by the management computers 102 and/or user computing devices 104 from sensors observing the conditions of the plurality of physical assets 120 of FIG. 1 (i.e., water pressure drop; decreases in tire pressure; status of one or more humidity, light, and temperature sensors; fire prevention system status; status of an appliance; etc.). In turn, degradation condition monitoring can be performed on an asset using newly captured values of the sensor data 434.

Figure 5:
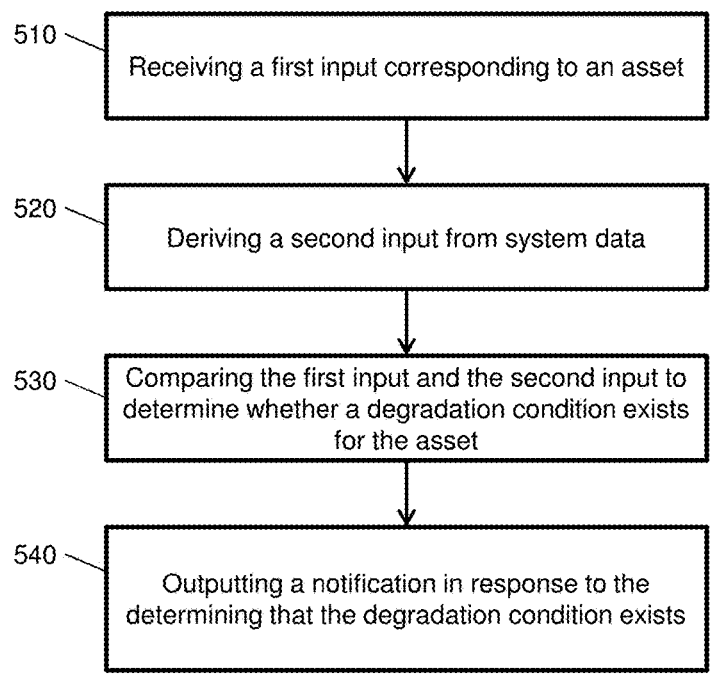
FIG. 5 depicts a process flow according to some embodiments of the present invention.

Turning now to FIG. 5, a process flow 500 is depicted according to an embodiment. In general, the process flow 500 is an example of an insurance company utilizing a management application 112 to proactively reduce the risks of asset damage or loss. In this way and as further described below, the management application 112 utilizes system data 404 of FIG. 4 during the process flow 500 to determine whether a degradation condition exists for an asset. Further, when the management application 112 determines for the asset that the degradation condition exists, the management application 112 outputs a notification that prompts an action that addresses the degradation condition (where the action can be action by an insured, an insurer, and/or an agent thereof).

The process flow 500 includes a number of blocks/steps that may be performed in the depicted sequence or in an alternate sequence. The process flow 500 may be performed by the system 100 of FIG. 1. In one embodiment, the process flow 500 is performed by one of the management computers 102 of FIG. 1; however, the process flow 500 may also be performed by one of the user computing devices 104. The process flow 500 is further described in reference to FIGS. 1-4 and 6-7.

Before the process flow 500 begins, an insurance company can utilize a management application 112 to process the policy data 422 of the system data 404. The processing of the policy data 422 identifies and acquires assets on a user basis. In this way, each asset that is insured by the insurance company can be evaluated under the process flow 500 to reduce the risk of loss, damage, failure, or liability. Further, each asset is associated with corresponding asset data, which can be divided into information subsets on a per asset basis.

Thus, while the process flow 500 generally describes an evaluation of one asset (and more particularly one aspect of one asset), multiple instances of the process flow 500 may be simultaneously executed for each asset (and each aspect of each asset) identified in the policy data 422. In turn, through the multiple instances of the process flow 500, the management application 112 can monitor information subsets of asset data and to identify a degradation condition for each specific asset.

The process flow 500 begins at block 510, where the management application 112 of the one of the management computers 102 receives through a communication interface module 406 a first input corresponding to one of a plurality of assets identified by the policy data 422. To receive the first input, sensor data 434 can be detected at the location of the asset, transferred over the network 106, and supplied through a communication interface module 406 to the management application 112. The management application 112 can actively use push or pull data acquisition methods to receive the first input, or the management application 112 can passively receive the first input from any device or component of the system 100. In this way, when the management application 112 identifies as an asset, the management application 112 can push or pull sensor data 434 from instrumentation localized to that asset. Thus, any received sensor data 434 can be included in the first input.

With respect to instrumentation being localized to the asset, embodiments will now be described. In one embodiment, the asset can include, as instrumentation, a computer system that is already monitoring the components of the asset. For example, a vehicle (e.g., a car) can include as instrumentation a computer system that is already monitoring the operating components of the car. Further, the management application 112 can communicate with this computer system and receive sensor data 434 directly.

In another embodiment, the asset can include, as instrumentation, sensors installed throughout the asset to detect the status of aspects of the asset. For example, a car can include, as instrumentation, sensors installed throughout the car to detect the status of aspects of the car. The management application 112 can communicate with these sensors and receive sensor data 434 directly.

In another embodiment, the management application 112 can communicate with one of the user computing devices 104 that is associated with the user responsible for the asset. The user responsible for the asset and the associated user computing device 104 can be identified by the policy data 422. In this embodiment, the associated user computing device 104, with a risk reduction tool 114 installed thereon, can be an intermediary instrumentation between the asset, computer system of the asset, and/or sensors of the asset and the management application 112. For example, the management application 112 can communicate with one of the user computing devices 104 that are associated with the user responsible for the car.

With respect to the first input, the management application 112 receives sensor data 434 as the first input that corresponds to multiple aspects of the asset. With respect to the car example and as noted above, the multiple aspects can include tire pressure, engine temperature, car fluid levels, airbag status, engine status, fluid status, headlight status, etc. The sensor data 434 for each of these multiple aspects can comprise a Boolean value (i.e., 0 or 1) indicating functioning or nonfunctioning, a variable across a range (e.g., an asset trend such as tire pressure over time), or combination thereof.

Next at block 520, the management application 112 derives, as a second input, a benchmark from the system data 404 stored on a database 110 coupled to the system 100. Alternatively, the system data 404 can be stored locally to the management computer 102 on which the management application 112 is installed.

The benchmark, in general, can comprise one or more of a benchmark trend as described above, a failure point as described above, and a numerical threshold indicating a warning point (e.g., a value prior to reaching the failure point). The benchmark trend, the failure point, and the warning point can be derived from the system data 404 (e.g., similar asset data 426). In addition, the second input can comprise information resulting from a batch processing operation performed by the management application 112. Batch processing is the execution of a series of instructions by the management application 112 without manual intervention, where input parameters (e.g., system data 404) are processed through predefined scripts, command-line arguments, control files, or job control language.

For instance, because insurance companies have such a wide breadth of system data 404 based on their numerous policies, the management application 112 can utilize this breadth of system data 404 to derive benchmarks. For example, an insurance company can derive periods of operability as benchmarks from the system data 404 that relate to an average lifespan and/or an average wear and tear of an asset. Further, the management application 112 can model the system data 404 to derive a plurality of benchmarks that indicate an average condition change of any asset or any aspect of an asset over time.

In one embodiment, when the management application 112 of the insurance company collects sensor data 434 from 1000 similar cars, then each aspect of the sensor data 434 can be aggregated and evaluated with other system data 404 to produce an average condition change for the aspect of the sensor data 434 based on 1000 data samples. More particularly, in the case of tire pressure, if the sensor data 434 of a majority of these data samples indicates that an average operating tire pressure is 40 pounds per square inch, then the management application 112 determines that 40 pounds per square inch is the acceptable operating condition.

Further, if the management application 112 has identified that, for every data sample that indicates a tire pressure below 32 pounds per square inch, the policy data 422 includes an insurance claim request for an accident, then the management application 112 can determine that 32 pounds per square inch is a first benchmark for tire pressure. The management application 112 automatically correlates that low tire pressure can lead to accidents (e.g., due to a lack of traction between the car and the road). In turn, the management application 112 can utilize the first benchmark as warning point that triggers a notification as described below with respect to blocks 530 and 540.

Furthermore, if fifty data samples indicate that a zero reading occurred after the receipt of a data sample indicating a tire pressure of 50 pounds per square inch, the management application 112 can determine that 50 pounds per square inch is a second benchmark for tire pressure. The management application 112 automatically correlates that overinflated tires can lead to blowouts. In turn, the management application 112 can utilize the second benchmark as warning point that triggers a notification as described below with respect to blocks 530 and 540.

In addition, if the management application 112 has identified that, for every data sample that indicates a decrease of tire pressure between 40 pounds per square inch to 30 pounds per square inch over five days, the system data 404 indicates that new tires were purchased and placed on the car, then the management application 112 can determine that a pressure decreased trend from 40 pounds per square inch to 30 pounds per square inch is a third benchmark. This third benchmark can be utilized as a benchmark trend indicating a likelihood of damaged tires or rims. The management application 112 automatically correlates that decreasing tire pressure over five days at a rate of two pounds per day indicates a slow tire leak. In turn, the management application 112 can utilize the third benchmark as warning point that triggers a notification as described below with respect to blocks 530 and 540.

Next at block 530, the management application 112 calculates a difference between the first input and the second input. That is, if the difference exceeds a predetermined amount, then an existence of the degradation condition (in which substantial damage to or failure of the asset or a component of the asset is imminent) is indicated by the management application 112. In one embodiment, the management application 112 compares the first input and the second input to determine whether a degradation condition exists for the asset. That is, if the difference between the first input related to a currently evaluated asset and the benchmark of the second input exceeds a predetermined amount, then the management application 112 determines the degradation condition exists for the currently evaluated asset. Embodiments can also determine whether a degradation condition exists for the asset based on whether the first input is equal to or greater than a ceiling value, is equal to or less than a floor value, is equal to the boundary values of a range, or is outside of the range.

For example, if the first input includes sensor data 434 related to a currently evaluated vehicle that indicates that the tire pressure of that vehicle is 31 pounds per square inch, the management application 112 compares the 31 pounds per square inch to the first benchmark of 32 pounds per square inch. This comparison enables the management application to ascertain that the tire pressure of the currently evaluated vehicle is less than the first benchmark. In turn, the management application 112 determines that the degradation condition exists for the currently evaluated vehicle.

If the first input includes sensor data 434 related to the currently evaluated vehicle that indicates that the tire pressure is 50 pounds per square inch, then the management application 112 compares the 50 pounds per square inch to the second benchmark of 50 pounds per square inch. This comparison enables the management application to ascertain that the tire pressure of the currently evaluated car is equal to the second benchmark. In turn, the management application 112 determines that the degradation condition exists for the currently evaluated vehicle.

If the first input includes sensor data 434 related to the currently evaluated vehicle that indicates that an asset trend where a tire pressure has decreased over two days from 40 pounds per square inch to 36 pounds per square inch, then the management application 112 compares this asset trend to the third benchmark of a 40 to 30 pounds per square inch decrease over five days. This comparison enables the management application to ascertain that one of the tires of the currently evaluated vehicle is decreasing at a same rate as the third benchmark trend. In turn, the management application 112 determines that the degradation condition exists for the currently evaluated vehicle.

Next at block 540, the management application 112 outputs a notification in response to the determining that the degradation condition exists. The notification generally directs/prompts subsequent actions by either the user or the insurance company, examples of which include, but are not limited to, prompting of a user to address the degradation condition; sending the notification to an electronic device at a time prior to a failure of the asset; sending the notification to the electronic device in response to detecting a current location of the electronic device and the current location being within a predetermined distance of a second location; sending a notification to an administrator of the insurance company; etc. Since the degradation conditions were determined in view of the first, second, and third benchmarks, notifications can be sent by the management application 112 to prompt a user to check the tires of the vehicle and/or replace the tires entirely. In another embodiment, a notification can be sent by the management application 112 to an insurance company as an indication of a possibility of a claim request relative to the first, second, and third benchmarks. That is, if the currently evaluated vehicle is determined to have a degradation condition, the management application 112 can produce an automatic estimation of the insurance liability that can be further utilized to project future financials for the insurance company.

Figure 6:
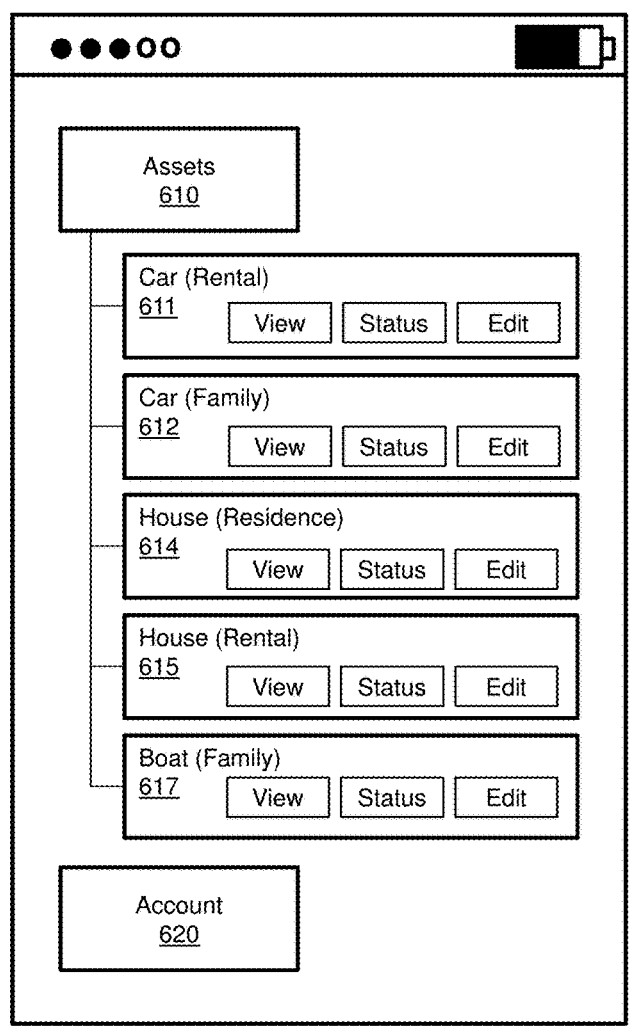
FIG. 6 depicts an example of a user interface according to some embodiments of the present invention.
Figure 7:
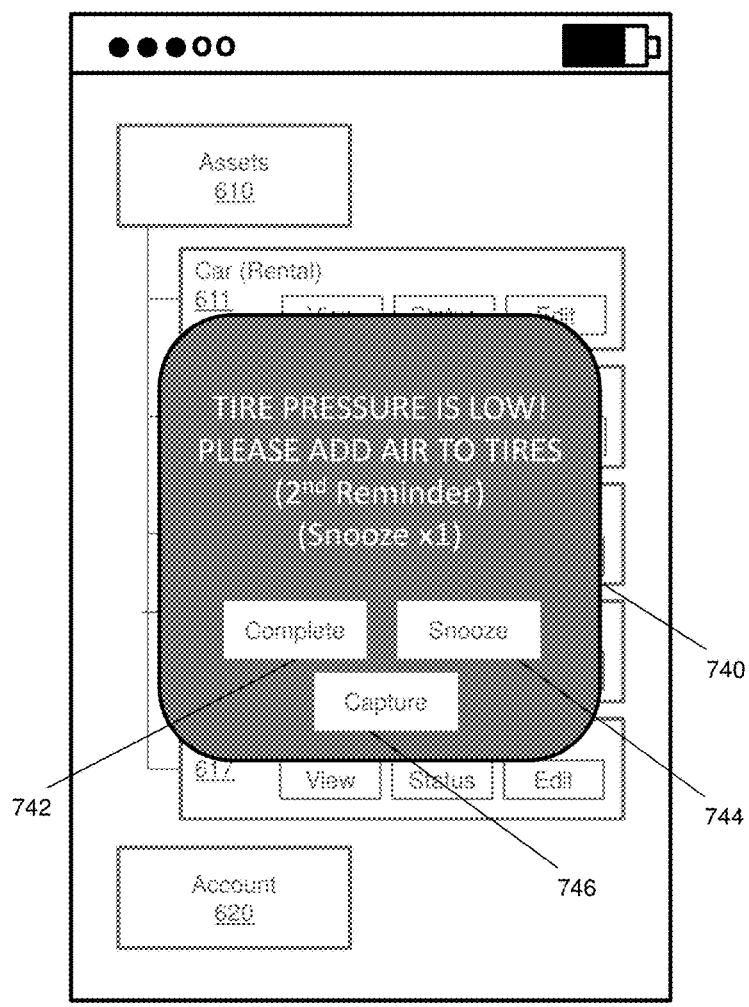
FIG. 7 depicts another example of a user interface according to some embodiments of the present invention.

Outputting a notification will now be described with reference to FIGS. 6-7. FIG. 6 depicts an example of a user interface 600 of the risk reduction tool 114 of FIG. 1. FIG. 7 depicts another example of a user interface 700 of the risk reduction tool 114 of FIG. 1 according to some embodiments. The user interfaces 600, 700 in FIGS. 6-7 may be generated as a result of the management application 112 communicating the system data 404 to the risk reduction tool 114. Alternatively, these user interfaces 600, 700 may be generated by the risk reduction tool 114 based on system data 404 stored locally to the user computing devices 104. Further, the user interfaces 600, 700 (e.g., shown on the user computing device 104) depict the policy information of a user who has multiple assets insured with an insurance company, as itemized on the interface. In this way, the system data 404 communicated to the user computing device 104 includes policy data 422 specific to that user.

With respect to FIG. 6, the user interface 600 is an example of a home or main screen where a current user can select from one or more menu options (e.g., Assets 610, Account 620). Upon selection of the Assets 610 menu option, the user interface 600 presents each asset within the policy data 422 of the user. As depicted, the Assets 610 included in the user interface 600 are Cars 611, 612, Houses 614, 615, and a Boat 617. The type of policy is reflected in parenthesis next to the type of asset. For instance, Car 611 and House 615 are rental properties and thus have different insurance policies than the personal properties of Car 612 and House 614 (note that different insurance policies can affect the information of the notification). Each asset is further selectable through View, Status, and Edit icons. When selected, the View icon may trigger the risk reduction tool 114 to present information about the asset, the Status icon may trigger the risk reduction tool 114 to present the status of different aspects of the asset based on sensor data 434 within the system data 404, and the Edit icon may trigger the risk reduction tool 114 to present options for updating the information of the asset (e.g., indicate that the tires have been changed).

With respect to FIG. 7, the user interface 700 is an example of presenting information through a prompt 740 (e.g., a notification). The prompt 740 includes an indication of the degradation condition, which in the example of process flow 500 is that there is a tire pressure issue (i.e., 'TIRE PRESSURE IS LOW!'). The prompt includes instructions on how to address the degradation condition (i.e., 'PLEASE ADD AIR TO TIRES'); an indication of how many notifications have been sent (i.e., '($2^{nd}$ Reminder)'); and an indication of how many times the snooze function has been selected (i.e., '(Snooze ×1)'). The prompt also includes icons 742, 744, 746 for receiving user feedback, as further described below with respect to FIG. 8. Although depicted as a general message in FIG. 7, the prompt 740 can also identify which of the Cars 611, 612 has low tire pressure, as well as which specific tire has an issue, e.g., a front-driver-side tire.

It will be understood that the user interface 600 of FIG. 6 and the user interface 700 of FIG. 7 are merely examples, and elements can be added or removed. Moreover, the sequence of user interfaces depicted in FIGS. 6-7 represents a subset of user interfaces associated with a subset of assessment types. Other asset types can include customized user interfaces based on different system data 404 (FIG. 4).

Figure 8:
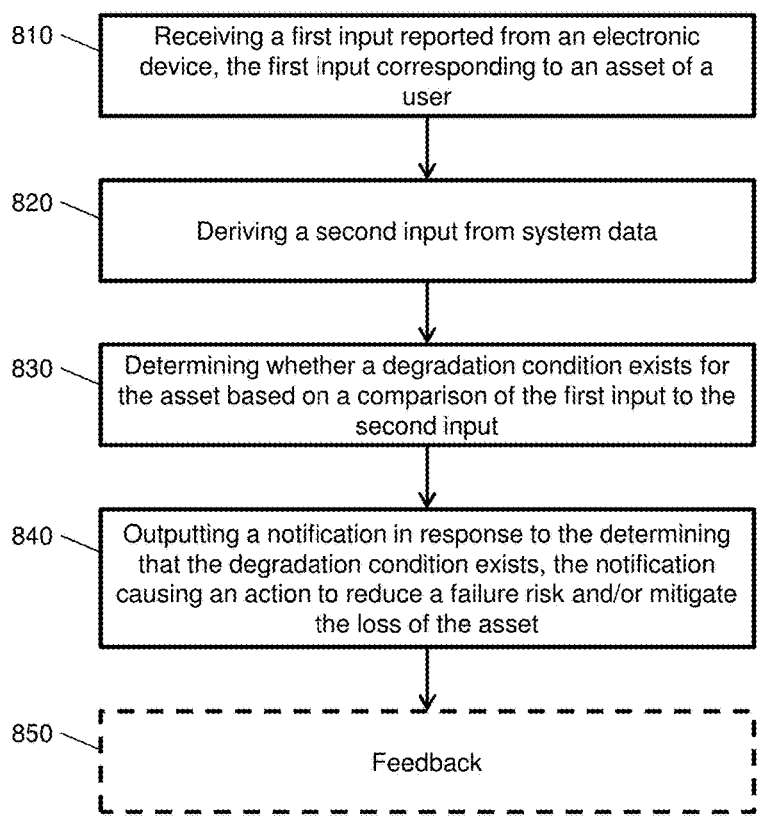
FIG. 8 depicts another process flow according to some embodiments of the present invention.

Turning now to FIG. 8, a process flow 800 is depicted according to an embodiment. The process flow 800 includes a number of blocks/steps that may be performed in the depicted sequence or in an alternate sequence. The process flow 800 may be performed by the system 100 of FIG. 1. In one embodiment, the process flow 800 is performed by one of the user computing devices 104 of FIG. 1; however, the process flow 800 may be performed by one of the management computers 102 or other systems that communicate a notification to the user computing devices 104 as further described below. The process flow 800 is further described in reference to FIGS. 1-4, 7, and 9-10.

The process flow 800 begins at block 810, where the risk reduction tool 114 of the one of the user computing devices 104 receives through a communication interface module 406 a first input corresponding to one of a plurality of assets identified by the policy data 422. To receive the first input, sensor data 434 can be detected at the location of the asset and transferred directly to the risk reduction tool 114.

Figure 9:
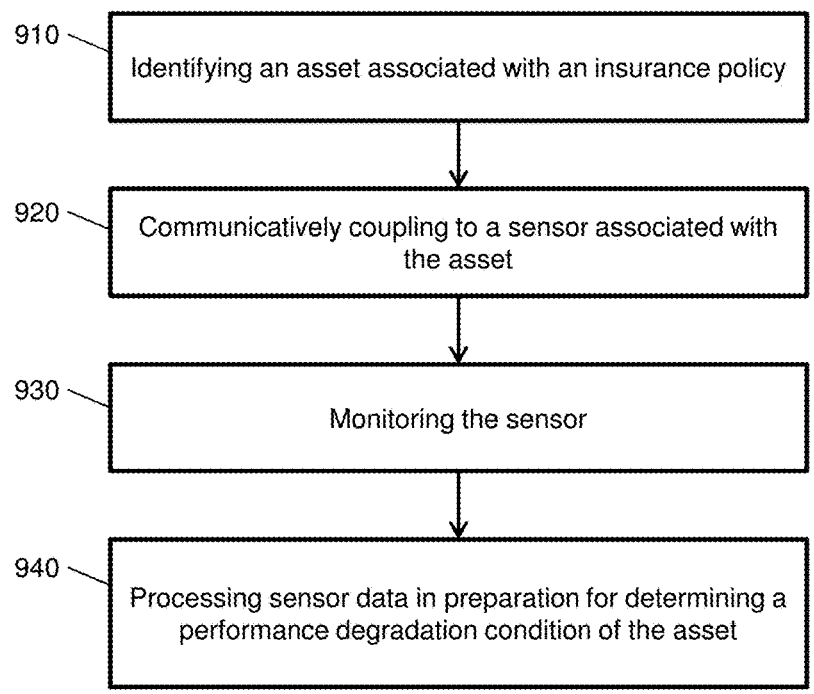
FIG. 9 depicts another process flow according to some embodiments of the present invention.

Block 810 is further described with respect to a process flow 900 of FIG. 9 in accordance with an embodiment. The process flow 900 describes operations that can support the receiving of the first input at block 810 by the risk reduction tool 114. The process flow 900 begins in block 910, where the risk reduction tool 114 identifies an asset associated with an insurance policy. That is, the risk reduction tool 114 can acquire system data 404 from an insurance company, or the insurance company can provide system data 404 to a risk reduction tool 114, which in turn can process the system data 404. Based on processing the system data 404, the risk reduction tool 114 can identify a plurality of assets associated with the user, so that each asset belonging to the user can be evaluated under the process flow 800 to reduce the risk of loss, damage, failure, or liability.

For example, when the risk reduction tool 114 acquired the system data 404 from an insurance company, the risk reduction tool 114 identified that the user had a number of insurance policies with respect to the assets of the user interface 600 (e.g., Cars 611, 612, Houses 614, 615, and a Boat 617). With respect to the House 615, the insurance policy may include a clause for flood damage (i.e., natural flooding or flooding resulting from a mechanical failure of the plumbing system).

Next, at block 920, the risk reduction tool 114 can communicatively couple with instrumentation associated with the asset. For instance, the risk reduction tool 114 can establish communication with sensors using any combination of communication technologies, such that the sensors are paired with the user computing device 104 with the risk reduction tool 114 installed thereon. Continuing with the above example, the risk reduction tool 114 of the user computing device 104 can be in communication with a plurality of sensors distributed throughout the plumbing system of the House 614. Each of these sensors communicates sensor data 434 to the risk reduction tool 114 through, for instance, a home network.

Next, at block 930, the risk reduction tool 114 can monitor the sensor for specific asset information. The specific asset information can include raw sets of values of qualitative or quantitative variables, individual pieces of information, and/or unprocessed collections of characters. The risk reduction tool 114 can actively use push or pull data acquisition methods to receive the first input, or the risk reduction tool 114 can passively receive the first input from instrumentation localized to that asset (e.g., sensors local—in physical communication to detect changes—to the asset). For example, if the plumbing system has one or more internal and flow pressure sensors, the risk reduction tool 114 can pull pressure and flow rate information from the plumbing system of the House 614.

Next, at block 940, the risk reduction tool 114 can process the specific asset information in preparation for determining a degradation condition of the asset. For instance, the risk reduction tool 114 may compile via the change detection module 416 of FIG. 4 the specific asset information into data structures (e.g., sensor data 434). Thus, any sensor data 434 received by the risk reduction tool 114 can be included in the first input. For example, pressure and flow information can be processed to detect the status of the plumbing system.

Returning to FIG. 8, the process flow 800 proceeds to block 820, where the risk reduction tool 114 can derive a second input from the system data 404, such as deriving a benchmark from the system data 404 stored on a database 110 coupled to the system 100 and/or system data 404 stored locally on the user computing device 104. For example, utilizing sensor data 434 from other plumbing systems of other houses, the risk reduction tool 114 can determine average pressure and flow amounts. In turn, the risk reduction tool 114 can establish a plurality of benchmarks for the plumbing system with respect to failure points, warning points, and/or benchmark trends.

Next at block 830, the risk reduction tool 114 can determine whether a degradation condition exists for the asset based a comparison of the first input to the second input. For example, if the pressure of the plumbing system at the House 614 is equal to or lower than a reduction benchmark derived to be a warning point, then a degradation condition exists.

Then at block 840, the risk reduction tool 114 outputs a notification in response to the determining that the degradation condition exists, the notification causing an action to reduce a failure risk of the asset. For instance, the notification can be a message that instructs the user to 'CHECK YOUR WATER HEATER'. In addition, the process flow 800 may optionally include a feedback operation where a user submits information to the system 100 at block 850. Returning to FIG. 7, the prompt 740 may include this message, along with the icons 742, 744, 746 configured for receiving user feedback. If the user performs the instructed action, the user may select the complete icon 742. If the user is unable to perform the instructed action, the user may select the snooze icon 744. The snooze icon 744 may be selected multiple times, and each subsequent notification can be identified in each notification (e.g., prompt 740 presents a notice that this is the '$2^{nd}$ Reminder' and that snooze has been pressed once). In addition, the user may select the capture icon 746, which enables the camera 350 to image a basement of the House 614 to verify that the basement was not flooded.

Figure 10:
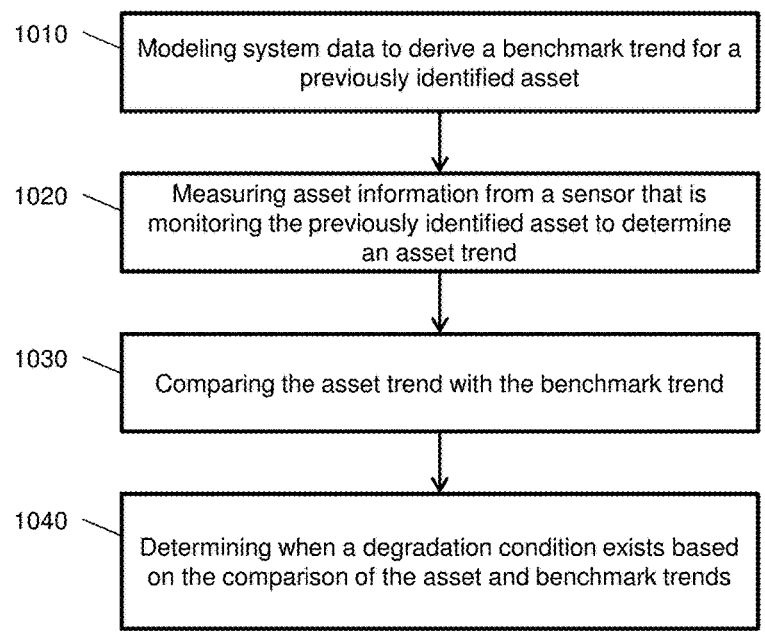
FIG. 10 depicts another process flow according to some embodiments of the present invention.

Turning now to FIG. 10, a process flow 1001 describes an example of operations that can support the calculation of trends at block 820 and the determining of whether the degradation condition exists at block 830 by the risk reduction tool 114.

The process flow 1001 begins in block 1010, where the risk reduction tool 114 can model system data 404 to derive, as a benchmark, a benchmark trend for the previously identified asset. For example, utilizing sensor data 434 from other sensors associated with other plumbing systems of other houses, the risk reduction tool 114 can determine correlations over time between pressure and flow amounts. In turn, the risk reduction tool 114 can establish a benchmark trend for a plumbing system between pressure and flow rate of the system 100 and an observed pressure and flow rate of an asset being monitored.

Next at block 1020, the risk reduction tool 114 can measure asset information from a sensor (e.g., sensor data 434) that is monitoring the previously identified asset to determine an asset trend. For example, utilizing sensor data 434 from the sensors associated with the plumbing system of the House 614, the risk reduction tool 114 can determine correlations over time between pressure and flow rate. In turn, the risk reduction tool 114 can establish an asset trend for pressure and flow rate.

Then, at block 1030, the risk reduction tool 114 can compare the asset trend with the benchmark trend. Next, at block 1040, the risk reduction tool 114 can determine when a degradation condition exists based on the comparison of the asset and benchmark trends.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, for example, electro-magnetic, optical, or any suitable combination thereof. A computer readable signal medium may comprise any computer readable medium that is not a computer readable storage medium and that can communicate, propagate, or transport a program for use by or in connection with an instruction execution system, apparatus, or device.

The computer readable medium may contain program code embodied thereon, which may be transmitted using any medium, such as wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system for providing a notification based on a degradation condition, comprising:
   a processing device; and
   a memory device in communication with the processing device, the memory device storing instructions that when executed by the processing device result in:
   receiving, by the processing device, a first input corresponding to an asset of a user from an electronic device associated with the asset and in communication with the processing device, the first input comprising a first set of sensor data received from one or more sensors associated with the asset;
   deriving, by the processing device, as a second input, a benchmark from system data stored on a database communicatively coupled to the processing device, wherein the system data comprises:
   policy data itemizing insurance policy information; and
   a second set of sensor data detected by a plurality of sensors monitoring a plurality of insured assets associated with the policy data, wherein the insured assets are of a same asset type as the asset;
   calculating, by the processing device, a difference between the first input and the second input, wherein a difference exceeding a predetermined amount indicates existence of the degradation condition, in which substantial damage to or failure of the asset or a component of the asset is imminent; and
   outputting, by the processing device, the notification in response to the indication of the existence of the degradation condition, the notification prompting an action to prevent the substantial damage to or the failure of the asset or the component of the asset, wherein the outputting of the notification comprises sending the notification to a user device at a time prior to the substantial damage to or the failure of the asset or the component of the asset occurring, and the user device comprises a user interface having one or more icons wherein at least one of the icons when activated by the user is configured to image the asset to verify a condition of the asset.

2. The system of claim 1, wherein the benchmark comprises a benchmark trend, a failure point, or a warning point derived from the system data via a batch processing operation.

3. The system of claim 1, wherein the instructions, when executed by the processing device, further result in modeling the system data to derive, as the benchmark, an average condition change related to the asset over time.

4. The system of claim 1, wherein the benchmark comprises a benchmark trend comprising an average condition change of the asset over time prior to an average failure point of the asset,
wherein the first input includes an asset trend indicating an actual condition change of the asset over time, and
wherein the instructions with respect to the calculating of the difference between the first input and the second input, when executed by the processing device, further result in:
comparing the asset trend with the benchmark trend to determine if the actual condition change approaches the average failure point at a rate faster than the average condition change; and
determining that the degradation condition exists in response to the actual condition change approaching the average failure point at the rate faster than the average condition change.

5. The system of claim 1, wherein the first input comprises asset data, and
wherein the instructions, when executed by the processing device, further result in:
monitoring the asset data received from the electronic device to determine an actual condition change of the asset over time.

6. The system of claim 5, wherein the asset data is generated by instrumentation local to the asset, and
wherein the processing device is in communication through the electronic device with the instrumentation.

7. The system of claim 5, wherein the asset data comprises usage information specific to the asset.

8. The system of claim 1, wherein the asset comprises one of a plurality of assets corresponding to asset data,
wherein the asset data comprises information subsets,
wherein each information subset corresponds to a specific asset of the plurality of assets,
wherein the benchmark comprises a benchmark trend for each of the plurality of assets, and
wherein the instructions, when executed by the processing device, further result in:
monitoring each information subset to determine an asset trend for each specific asset; and
calculating a difference between each asset trend and a respective benchmark trend to determine a corresponding degradation condition.

9. The system of claim 1, wherein the asset comprises a movable asset.

10. The system of claim 1, wherein the notification comprises at least one of an instruction to check a roof for leaks, an instruction to prepare for severe weather, and an instruction to perform home maintenance.

11. The system of claim 1, wherein the notification comprises an instruction to estimate an insurance liability associated with a failure of the asset.

12. The system of claim 1, wherein the asset comprises a vehicle or a structure.

13. The system of claim 1, wherein the first input comprises one or more real-time sensor outputs of the one or more sensors associated with the asset.

14. The system of claim 13, wherein the one or more real-time sensor outputs indicate at least one of a change in water pressure, and a humidity sensor status.

15. A computer program product comprising a non-transitory storage medium embodied with computer program instructions that when executed by a processing device cause the processing device to implement:
receiving, by the processing device, a first input corresponding to an asset of a user from an electronic device associated with the asset and in communication with the processing device, the first input comprising a first set of sensor data received from one or more sensors associated with the asset;
deriving, by the processing device, as a second input, a benchmark from system data stored on a database communicatively coupled to the processing device, wherein the system data comprises:
policy data itemizing insurance policy information; and
a second set of sensor data detected by a plurality of sensors monitoring a plurality of insured assets associated with the policy data, wherein the insured assets are of a same asset type as the asset;
calculating, by the processing device, a difference between the first input and the second input, wherein a difference exceeding a predetermined amount indicates existence of the degradation condition, in which substantial damage to or failure of the asset or a component of the asset is imminent; and
outputting, by the processing device, the notification in response to the indication of the existence of the degradation condition, the notification prompting an action to prevent the substantial damage to or the failure of the asset or the component of the asset, wherein the outputting of the notification comprises sending the notification to a user device at a time prior to the substantial damage to or the failure of the asset or the component of the asset occurring, and the user device comprises a user interface having one or more icons wherein at least one of the icons when activated by the user is configured to image the asset to verify a condition of the asset.

16. The computer program product of claim 15, wherein the benchmark comprises a benchmark trend, a failure point, or a warning point derived from the system data via a batch processing operation.

17. The computer program product of claim 15, wherein the computer program instructions that when executed by the processing device cause the processing device to further implement:
modeling the system data to derive, as the benchmark, an average condition change related to the asset over time.

18. The computer program product of claim 15, wherein
wherein the benchmark comprises a benchmark trend comprising an average condition change of the asset over time prior to an average failure point of the asset,
wherein the first input includes an asset trend indicating an actual condition change of the asset over time, and
wherein the computer program instructions with respect to the calculating of the difference between the first input and the second input, when executed by the processing device, cause the processing device to further implement:
comparing the asset trend with the benchmark trend to determine if the actual condition change approaches the average failure point at a rate faster than the average condition change; and
determining that the degradation condition exists in response to the actual condition change approaching the average failure point at the rate faster than the average condition change.

19. The computer program product of claim 15, wherein the first input comprises asset data, and
   wherein the instructions, when executed by the processing device, further result in:
   monitoring the asset data received from the electronic device to determine an actual condition change of the asset over time.

\* \* \* \* \*